Jan. 2, 1945.  W. R. GRISWOLD  2,366,253
DRIVE MECHANISM
Filed May 29, 1939  2 Sheets-Sheet 1

INVENTOR.
Walter R. Griswold
BY Sibbetts & Hart
ATTORNEYS

Jan. 2, 1945.  W. R. GRISWOLD  2,366,253
DRIVE MECHANISM
Filed May 29, 1939  2 Sheets-Sheet 2
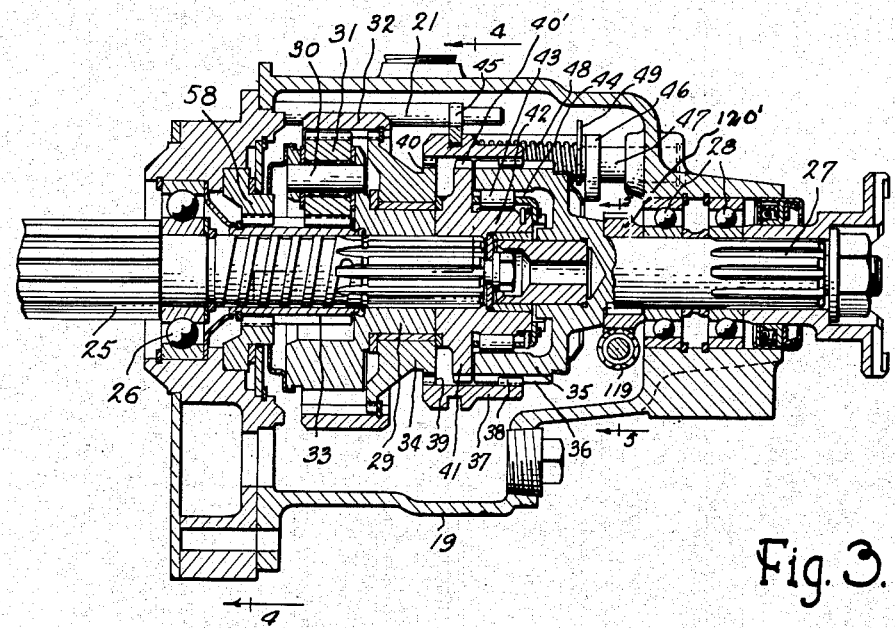
Fig. 3.
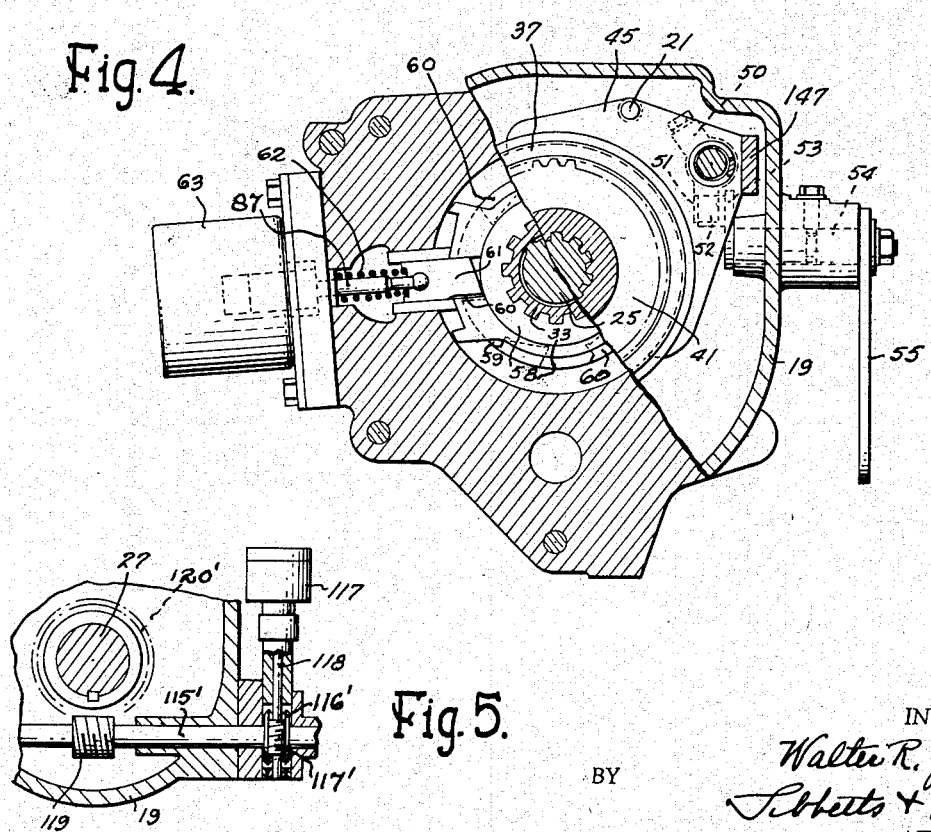
Fig. 4.
Fig. 5.
INVENTOR.
Walter R. Griswold
BY Tibbetts & Hart
ATTORNEYS Patented Jan. 2, 1945

2,366,253

UNITED STATES PATENT OFFICE 2,366,253

DRIVE MECHANISM

Walter R. Griswold, Detroit, Mich., assignor to Packard Motor Car Company, Detroit, Mich., a corporation of Michigan Application May 29, 1939, Serial No. 276,317

14 Claims. (Cl. 74—472)

This invention relates to motor vehicle transmission mechanism that can be regulated to vary the driving speed delivered by selective change speed gearing.

Some motor vehicle transmission mechanisms are now equipped with planetary gearing between the change speed gearing and the tail shaft that can be controlled to provide a direct drive or a modified drive therethrough. The sun gear has been held stationary and released by means of a device responsive to a solenoid under control of the driver, usually by mechanism operable from the accelerator pedal. In addition to this type of control, a governor device in the form of a centrifugal clutch has also been associated in the planetary gearing to mechanically establish a modified drive above a predetermined vehicle speed. Such centrifugal governor control means has been arranged to connect two elements that are rotating at different speeds when first operating to establish a modified driving speed, and undesirable noise and wear have been found to result. In addition to these undesirable conditions, the use of such a mechanical governor device tends to complicate the transmission mechanism and increases the overall dimensions of the structure.

It is an object of the invention to provide a transmission mechanism, of the type referred to, in which the clutch is eliminated.

Another object of the invention is to provide transmission mechanism, of the type referred to, in which the solenoid responds to either a manual effort or a speed governor for similarly modifying the drive to the tail shaft.

Another object of the invention is to control a transmission mechanism, of the type referred to, by an electromagnetic device that is responsive to either physical effort or speed.

A further object is to provide a transmission mechanism in which a controlled planetary gearing in constant driven relation with a driven shaft is normally connected to a tail shaft by an intermediate clutch in positively engaged relation.

Another object of the invention is to provide a transmission mechanism in which change speed planetary gearing is electro-magnetically regulated under the control of a governor.

Other objects of the invention will appear from the following description taken in connection with the drawings, which forms a part of the specification, and in which:

Fig. 3 is a sectional view of the mechanism for varying the speed transmitted from the change speed gearing to the tail shaft;

Fig. 4 is a sectional view taken on line 4—4 of Fig. 3;

Fig. 5 is a fragmentary sectional view showing the driving connection between the tail shaft and the governor in overdrive position.

Figure 1:
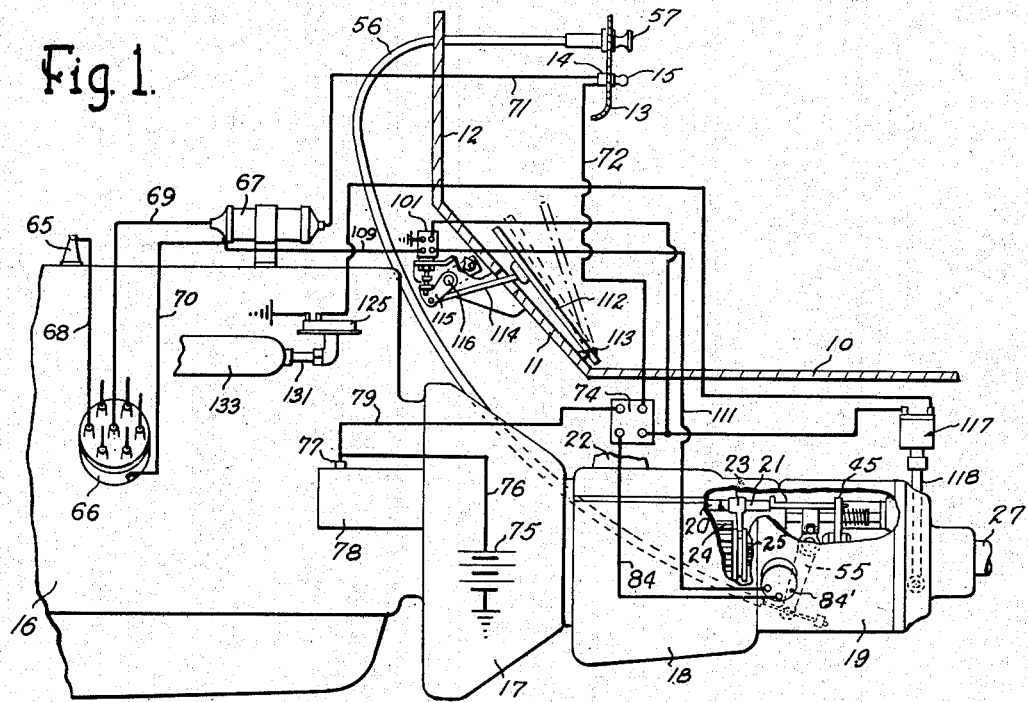
Fig. 1 is a diagrammatic view of a portion of a motor vehicle with which the invention is associated, showing the transmission mechanism in position for reverse drive.

Referring to the drawings by characters of reference, 10 represents the floor board of a motor vehicle body having at the front end thereof a toe board 11 that terminates at its forward end in a dash 12. The instrument panel 13 carries a conventional ignition switch 14 that is controlled by a key 15.

The power transmitting unit consists of the engine 16, the main clutch containing casing 17 at the rear of the engine, a change speed gearing casing 18 at the rear of the clutch casing, and casing 19 at the rear of the transmission mechanism casing containing drive modifying mechanism. The change speed gearing in casing 18 is conventional and controlled by a pair of shift rods 20 and 21 actuated by conventional mechanism under the control of a shift lever (not shown) extending from the tower 22 on top of the casing 18. The shift rod 21 carries a yoke 23 that engages with and shifts a gear element 24 for selectively establishing either first or reverse drive, the gear element in its rearmost position meshing with the conventional reverse idler (not shown).

The driven shaft 25 at the rear end of the change speed gearing projects through the front wall of the casing 19 and is suitably supported therein by ball bearing 26. In axial alignment with shaft 25 is a tail shaft 27 that projects through the rear wall of casing 19 and is suitably supported therein by ball bearings 28. These shafts 25 and 27 are connected in driving relation by mechanism that can be controlled to selectively provide a direct drive between the shafts, or a modified drive from shaft 25 to shaft 27 which in this instance is overdrive, or a direct drive through an overrunning clutch. Associated with the shaft 25 is planetary gearing consisting of a cage 29, having a rearwardly extending sleeve portion splined to shaft 25, carrying journals 30 on which planet gears 31 are rotatably mounted. The planet gears mesh with internal teeth of a planetary ring gear 32 and they also mesh with the external teeth of a sun gear 33 rotatably mounted on the shaft 25. Rotatably mounted on the sleeve portion of cage 29 and fixed to rotate with the ring gear 32 by means of splines is a clutch element 34. The ring 32 and the clutch element 34 can be formed as one piece if desired. The forward end of the tail shaft 27 is enlarged and formed with a flange 35 on which are formed clutch teeth 36, and an axially shiftable clutch sleeve 37 telescopes the forward portion of this flange 35 and has internal teeth 38 that are in constant meshing driving relation with the teeth 36. At the forward end of this shiftable clutch sleeve are provided internal teeth 39 that can be moved into or out of driving engagement with teeth 40 formed on the rear end of the clutch element 34. A driving member 41 is splined to the rear of the shaft 25 between the flange 35 on the tail shaft and the planetary cage 29. This driving member has teeth 40' similar to and arranged to align with the clutch teeth 36 so that they can be engaged by the teeth 39 of the clutch sleeve 37 when shifted to rearmost position. This driving member is formed with a rearwardly extending flange 42 providing cam surfaces and between such cam surfaces and the interior wall of the tail shaft flange 35 is arranged a plurality of rollers 43 carried by a cage 44 adapted to provide an overrunning clutch connection between the member 41 and the tail shaft 27.

The clutch sleeve 37 is shiftable manually to provide a direct driving connection from either the clutch element 34 or the driving member 41 to the tail shaft 27, thus eliminating the drive through the overrunning clutch when the sun gear is held stationary to provide overdrive. In order to control the position of this clutch sleeve it is engaged by a yoke 45 forming one end of a U-shaped device that includes a ring 46, slidably mounted upon a shaft 47 that is mounted for limited axial movement in casing 19, and a connecting strap 147. A coil spring 48 surrounds the shaft 47 and is anchored at its rear end to such shaft by a spring clip 49, and its front end bears against the yoke 45. Fixed on the shaft 47 in advance of the yoke is an actuator member 50 having a pair of spaced fingers 51 depending therefrom between which a cam element 52 extends. This cam element is carried by an arm 53 fixed upon the end of a shaft 54 projecting through and carried by the side wall of casing 19. Fixed to the outer end of this shaft 54 is a lever 55 and connected to the lever 55 is a Bowden wire 56 that extends to the instrument panel and terminates in a control knob 57.

By pulling the knob outwardly from the dash, the lever 55 is moved forwardly and rocks the shaft 54 to operate the cam 53 so that the actuator 50 fixed to the shaft 47 is moved rearwardly and as the yoke 45 lies thereagainst it is also moved rearwardly thus moving the clutch sleeve 37 rearwardly so that the teeth 39 will engage the clutch 40' of drive element 41. A direct drive is thus provided from shaft 25 to shaft 27. This same result can be accomplished when the change speed gear mechanism is associated in a reverse drive relation as shown in Fig. 1. In order to obtain reverse drive, the rail 21 is moved rearwardly and it is provided with a shouldered extension that projects into the casing 19 and pushes the yoke 45 therewith on shaft 47 so that the clutch teeth 39 will be caused to mesh with the teeth 40' on drive element 41. Except when manually shifted in the two ways just described, the clutch sleeve is engaged with the planetary ring gear clutch by spring 48.

The planetary gearing is controlled by means of a device associated with the sun gear whereby the gear is locked or released. In the present instance a collar 58 is splined to the forward end of the sun gear and such collar is provided with a flange 59 having a plurality of radially extending recesses 60 adapted to receive a pawl 61. This collar could be an integral part of the sun gear. The pawl is slidably mounted in the forward wall of casing 19 and is normally urged into locking relation with the sun gear flange by means of a coil spring 62. Thus the sun gear is normally locked so that it is fixed against rotation and, under such circumstance, the planet gear carrier being driven with shaft 25 will cause the planets to rotate around the sun gear thereby rotating the ring gear 32 at a faster speed than the shaft 25. While the planetary gearing is thus being controlled it will increase the speed of the drive from the change speed gearing to the tail shaft and provides a decrease in the over-all drive ratio. In other words, when the sun gear is held stationary and the drive is through the planetary gearing to the tail shaft, the speed of the drive shaft 27 is stepped-up beyond direct drive to provide overdrive. When the pawl is withdrawn from the sun gear the planetary gearing is free to idle as a unit and does no driving.

The pawl is moved from and held out of locking relation with the sun gear flange by an electro-magnetic device in the form of a solenoid 63. The control of this electro-magnetic device is so arranged that the vehicle driver can energize the same whenever desired, that is at will, and there is another control operated in accordance with predetermined speed ranges of the driven shaft, corresponding to the speed of the vehicle. The arrangement is preferably such that the electro-magnetic device will function to withdraw the pawl from the sun gear collar when the vehicle is traveling below a predetermined speed and to release the same above such speed.

The controls for the electro-magnetic device are associated with the electrical system for the engine preferably in order that the overdrive gearing can thus be regulated only when the ignition is turned on and can be utilized to function in certain relations with the engine spark control.

Associated with the engine is an ignition system that includes spark plugs for the cylinders as shown at 65, a distributor 66 and a coil 67. The distributor is connected to the spark plugs by the usual conductor wirings 68 and between the distributor and the ignition coil is a high tension conductor line 69 and a low tension conductor line 70. The ignition coil is connected with the ignition switch 14 by a conductor line 71 and another conductor line 72 leads from the ignition switch to a winding 73 of a relay indicated generally at 74. The grounded battery is indicated at 75 and is connected by a conductor 76 with a terminal 77 of the grounded starter motor 78. To this terminal 77 is connected a conductor line 79 leading to a contact 80 of the relay. In the relay is a switch member 81 normally held away from the contacts 80 and 82 by a coil spring 83 but arranged to establish the circuit therebetween under certain conditions when the ignition switch is closed.

The contact 82 has a conductor line 84 leading therefrom to a solenoid, indicated generally at 84', having a pair of windings 85 and 86 that surround the plunger actuator 87 having a ball end portion pivotally mounted in a cross slot in pawl 61. The coil 85 is grounded while the coil 86 is connected by a conductor line 88 with a breaker member 89 pivotally mounted and insulated as indicated at 90. The breaker member is preferably formed of resilient material that normally holds its contact 91, to which the conductor line 88 is attached, in engagement with the terminal 92 on the contact element 93, such element being grounded as at 94 to some suitable part of the vehicle. The coil 86 when energized acts to move the actuator 87 outwardly from the sun gear collar. The low tension line in the ignition system has associated therewith a ground-out arrangement for operating in timed relation with the solenoid system. This ground-out arrangement includes a disk switch 95 fixed to a stem 96 extending through an opening in the solenoid casing 97, the disk being arranged to engage the terminals 98 and 99 but is normally held out of such engagement therewith by a coil spring 100 seated against a wall of the solenoid housing.

A switch structure, indicated generally by the numeral 101, carries a pair of oppositely disposed contacts 108 and 110. A conductor line 111 connects the contact 110 with the contact 98 and the conductor line 109 connects the contact 108 with the coil terminal to which the conductor line 70 is connected. Arranged within this switch housing is a movable plunger 102 having one end projecting through an end of the housing and the opposite end engaged by a spring 105 normally urging the plunger toward its projected position. This plunger carries a pair of contact members 103 and 104, the contact member 104 being arranged to establish the connection between the contacts 108 and 110. The contact member 103 is arranged to establish a connection between the contact 107' and the contact 108', the contact 107' being suitably grounded as indicated. This projecting end of the plunger 102 is arranged to be actuated to close the contacts just mentioned through mechanism under manual control. The arrangement is such that this switch can be operated at will and it is preferably arranged to be actuated by a mechanism associated with the accelerator pedal so that the contacts will be closed when the accelerator pedal is depressed beyond its lower dotted position, see Fig. 1, where wide open throttle is obtained. The accelerator pedal is indicated at 112 and is pivoted at 113 to the toe board. Extending through the toe board and attached to the pedal is an actuator rod 114 that is pivotally mounted to an arm 115 fixed on a shaft 116 with which mechanism (not shown) is connected for operating the throttle. The arm 115 has an upstanding boss arranged to lie beneath the projecting end of plunger 102 so that when the accelerator pedal is depressed this boss will move upwardly and push the plunger inwardly of the switch housing to close the switches carried thereby.

Governor means is associated in the electrical system for controlling the electro-magnetic device so that a solenoid will be effective to urge the pawl out of locking relation with the sun gear whenever the vehicle speed is less than some predetermined amount such as thirty miles per hour for example. The governor is indicated generally at 117 and it is connected in driven relation with the tail shaft 27. Shaft 118 carries the weights and has a worm gear 117' meshing with gear 116' fixed on a cross shaft 115' in the casing 19. On shaft 115' is a gear 119 meshing with a drive gear 120' fixed on the tail shaft. It will be understood that such drive mechanism provides a speed reduction so that the governor acts in accordance with vehicle speed. This shaft 118 rotates centrifugally movable members indicated at 120 which in their movement control an over-center switch of conventional design indicated at 121. This switch is arranged to make or break the circuit through a pair of contact elements 122 and 123. A conductor line 124 connects the contact 122 with a control member, indicated generally at 125, and a conductor line 126 is connected with the contact member 123 and the coil 73 of the relay 74.

This contact 122 of the governor can be grounded directly if desired but it has been found that under some circumstances it is desirable to have some means for temporarily grounding out the governor circuit. Various types of grounding out controls can be used for this purpose but in the illustrated form a vacuum controlled type of device is illustrated. A vacuum casing 130 is suitably fixed to the engine by a tube 131 and has a flexible diaphragm plate 132 therein that can be moved in response to pressure variations. The upper wall of the housing is open to atmosphere and the tube 131 connects the lower part of the casing with the engine intake manifold 133. Fixed to the diaphragm is a pin 134 that projects through the upper wall of the casing and controls an over-center type of switch, of conventional design, indicated generally at 135. This switch is arranged to engage or disengage a contact 136 with which the conductor line 124 is connected and there is a ground indicated at 137 for this casing 130.

Depression of the accelerator pedal beyond wide open throttle position, as shown in full lines in Fig. 1, will move the arm 115 upwardly so that it pushes the switch plunger 102 upwardly causing the switch 104 to engage contacts 108 and 110 and the switch 103 to engage the contacts 107' and 108', the switch 104 closing slightly in advance of the switch 103. The closing of switch 103 will complete the current through the relay to energize the solenoid coils, thus drawing the stem 96 to engage contact disk 95 with contacts 98 and 99 and thereby ground the circuit leading from the coil to the distributor. In this manner several explosion sparks will be missed and thus the torque will be relieved so that the solenoid is enabled to withdraw the pawl 61 from holding the sun gear. The actuator 87 in its movement by the solenoid strikes the stem 96 to move the switch 95 away from contacts 98 and 99 thereby renewing the circuit to the distributor. The pawl will be held out of engagement with the sun gear collar as long as the pedal is pressed down beyond wide open throttle position and with the pawl released the sun gear is free to rotate and the drive will not be stepped-up by the planetary gearing so that the tail shaft 27 will be driven at the same speed as the drive shaft 26.

The centrifugal governor is set to close switch 121 when the vehicle is traveling below some predetermined speed such as thirty miles per hour and to open the switch when the vehicle is traveling above such speed. Assuming that the contact 122 is grounded, although this is not shown in the drawing, the weights 120 will be actuated to move the switch 121 so that the circuit to the solenoid is closed as the vehicle speed falls below thirty miles per hour and so that the solenoid circuit is opened when the vehicle speed exceeds thirty miles per hour. The drive result obtained will be the same as when the switch 101 is opened and closed.

When the vehicle is decelerating and less than thirty miles per hour vehicle speed is reached, the solenoid circuit will be closed, but the engine torque may be such that the pawl is held in locked position by a pressure that cannot be overcome by the average solenoid until substantially idling engine operation is reached. During such period the solenoid will be energized causing an unnecessary drain on the battery and undue deterioration of the solenoid coil windings.

Figure 2:
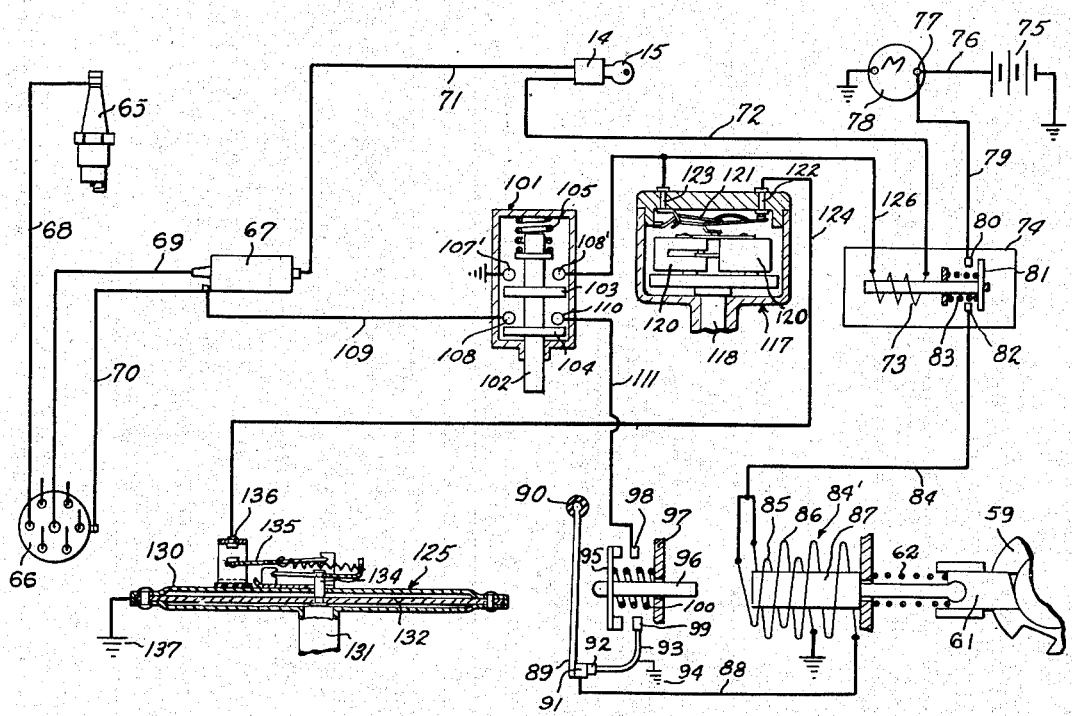
Fig. 2 is a diagram of the control mechanism for the transmission mechanism arranged to provide overdrive.

In order to overcome this loss of current when the solenoid fails to withdraw the pawl when decelerating below thirty miles per hour, a control means is connected in series with the contact 122. Various forms of control means can be employed for this purpose but in this instance the vacuum device 125 is utilized. The vacuum responsive plate 132 controls the switch 135 and as the housing 130 is grounded the switch 135 will open or close the governor circuit when moved away from or into engagement with contact 136 that is connected with contact 122. When decelerating the accelerator pedal is of course allowed to lift and the pressure in the intake manifold being reduced pulls the diaphragm 132 to open the switch 135 thus leaving the governor circuit open while the torque is reducing, as shown in Fig. 2, and when substantially idling speed is reached or when the throttle is closed pressure in the manifold increases and the diaphragm will be moved to close the switch and thus establish the governor circuit to the relay. Thus, during decelerating below thirty miles per hour and with the accelerator pedal lifted, current to the solenoids is cut off during the period consumed for relieving the engine torque sufficiently for the solenoid to withdraw the pawl.

As previously mentioned, the reverse shift rail moves and retains the clutch sleeve 37 in relation to establish direct drive from the member 41 to the tail shaft 27 when the change speed gearing is in reverse drive relation. Likewise the sleeve 37 can be shifted to a similar relation by pulling out the knob 57 at the dash. Under both circumstances there will be a direct positive drive from shaft 25 to shaft 27 that can not be disturbed by any of the various other controls.

Normally spring 48 holds the sleeve clutch 37 in position establishing a direct fixed driving connection between the planetary ring gear and the tail shaft. With such connection engaged, release of the pawl from the sun gear will cause the drive to be from shaft 25 through member 41 and the overrunning clutch 43 to the tail shaft, the planetary gearing idling. When the pawl is engaged to fix the sun gear, the drive will be from shaft 25, through carrier 29, planet gears 31, ring gear 32, sleeve 37 to tail shaft 27, the planetary gears rotating around the fixed sun gear will increase the speed of rotation of the tail shaft to provide overdrive. Thus when the accelerator operated switch is engaged the pawl is released and the drive will be direct from shaft 25 to shaft 27 through the overrunning clutch and when such switch is open the pawl, unless otherwise influenced, is engaged and overdrive is through the planetary gearing, sleeve clutch 37 to the tail shaft. When the vehicle speed is below thirty miles per hour, the governor 117 functions unless the ground-out control is employed, to close a circuit energizing the solenoid so that the pawl will be withdrawn, as soon as torque will permit, so that the drive is direct through the overrunning clutch, and above thirty miles per hour vehicle speed the governor opens the circuit to the solenoid and the pawl is engaged so that the planetary unit establishes overdrive to the tail shaft. The electrical system for controlling the solenoid may or may not include the ground-out control for the governor circuit to the relay.

It will be seen that the planetary gearing is directly clutched to the tail shaft except during reverse and dash button cut-out. The solenoid is controlled either manually or in accordance with vehicle speed to shift back and forth from overdrive to direct drive.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a motor vehicle transmission mechanism having a tail shaft adapted to be driven by a planetary gearing including a sun gear in driven relation with a shaft driven at selected speeds, control mechanism for the sun gear comprising a shiftable pawl engageable to prevent rotation of the sun gear, a spring normally urging the pawl into position holding said sun gear, electro-magnetic means operable to disengage the pawl from holding relation with the gear including a switch, a governor for actuating said switch to close the same, and a driving connection between the tail shaft and the governor, said governor being effective below a predetermined driven shaft speed to close said switch.

2. In a motor vehicle transmission mechanism having a planetary gearing in driving relation with a tail shaft including a sun gear, control mechanism for the planetary gearing comprising a shiftable pawl engageable to hold the sun gear, a spring normally urging said pawl into gear holding position, an electric system including a solenoid for shifting said pawl out of holding relation with said gear, a pair of switches each operative to close and open a circuit to the solenoid, a speed operated device for closing one of the switches, and a manually operable device for closing the other switch, said speed operated device being effective to close the switch with which it is associated below a predetermined speed of the tail shaft.

3. In a transmission mechanism, the combination of a driven shaft having a driving clutch member fixed thereon; a tail shaft; a planetary overdrive gearing including a planetary cage fixed on the driven shaft, planetary pinions mounted on the cage, a ring gear engaged by said pinions and a sun gear having a driving connection with the planetary pinions loosely mounted on the driven shaft; clutch means normally positioned to drivingly connect the ring gear and the tail shaft; means normally holding the sun gear; solenoid means for releasing said sun gear holding means, means operable at will for controlling said solenoid means, and governor means responsive to the speed of the tail shaft and operative below a predetermined speed of the driven shaft for controlling said solenoid means to release said sun gear holding means independently of said means operable at will.

4. In a transmission for motor vehicles, a driven shaft; a tail shaft; an overrunning clutch means for directly connecting the said shafts; planetary gearing including a sun gear loosely mounted on the drive shaft, a planet carrier fixed to the drive shaft and a ring gear; a clutch normally connecting said ring gear and tail shaft in direct driving relation; control means operable to hold said sun gear from rotating; and a pair of means for operating said control means similarly and independently to hold the sun gear, one of said pair of means being operable by the driver and the other of the pair of means including a governor operating in accordance with vehicle speed.

5. In a transmission for motor vehicles, a shaft driven at variable selected speeds, a tail shaft, planetary gearing connected to be driven by the driven shaft, control means operable to hold one portion of the planetary gearing, a shiftable clutch sleeve in constant driving relation with the tail shaft, a clutch member fixed on the driven shaft between the planetary gearing and the tail shaft, a spring normally engaging the shiftable clutch sleeve in positive driving relation directly with an unheld portion of the planetary gearing out of engagement with the clutch member, means operable to shift said clutch sleeve into engagement with the member, and an overrunning clutch in driving relation directly between the clutch member and the tail shaft.

6. In a power transmission for driving a motor vehicle having an internal combustion engine provided with an electrical ignition circuit and a driver manipulated throttle control; a driving shaft adapted to receive drive from the engine and a tail shaft adapted to drive from said driving shaft, planetary gearing operable between said shafts for driving the tail shaft from the driving shaft, holding means for controlling the operation of said planetary gearing, means for controlling operation of said holding means, said means including a solenoid for effecting release of said holding means, means operated by actuation of said throttle control for controlling the energization of said solenoid, solenoid actuated means for momentarily interrupting operation of said electrical ignition circuit when controlled by said means operated by said throttle control, and speed responsive means for controlling energization of said solenoid independently of said throttle control operated means.

7. In a power transmission for driving a motor vehicle having an internal combustion engine provided with an electrical ignition circuit and a driver manipulated throttle control; a driving shaft adapted to receive drive from the engine and a tail shaft adapted to drive from said driving shaft, planetary gearing operable between said shafts for driving the tail shaft from the driving shaft, holding means for controlling the operation of said planetary gearing, an electric system including a circuit having switches in parallel and a solenoid for controlling operation of said holding means, means operable by the vehicle driver for controlling one of the switches, means actuated by the solenoid for momentarily interrupting operation of said electrical ignition circuit when controlled by the driver operated means, said solenoid actuated means further including a follower member for restoring operation of said electrical ignition circuit, and governor means for controlling the switch in parallel with the driver controlled switch.

8. In a motor vehicle transmission mechanism having planetary gearing including a sun gear, control mechanism for said sun gear comprising a shiftable member operable to hold or release said sun gear, means for shifting said member comprising a circuit including a solenoid and a pair of switches in parallel for controlling energizing and deenergizing of said solenoid, driver operable mechanism for controlling one of said switches, and automatic means for controlling the other switch.

9. In a motor vehicle transmission, driving and driven shafts, planetary gearing including a ring gear member, a planet gear member and a sun gear member, said gearing being adapted, when one of said members is braked, to transmit drive of one ratio, another of said planetary members being connected to the drive shaft to receive drive therefrom, a manually shiftable jaw clutch element adapted in one position to connect the third planetary member to the driven shaft in driving relation thereto, means to automatically establish a one way drive of a lower ratio upon release of the braked member for rotation, said jaw clutch element being adapted in another position to provide a direct two way drive across said one way drive means, means for braking said first member, a solenoid for operating said braking means, and a governor for controlling the energization of said solenoid.

10. In a transmission for motor vehicles, a driven shaft; a tail shaft; planetary gearing having a carrier fixed to the driven shaft, a sun gear, a ring gear, and planet gears on the carrier meshing with the ring gear and the sun gear; means operable to selectively brake or release the sun gear; a clutch member fixed to rotate with th ring gear; a clutch member fixed to the driven shaft between the ring gear clutch member and the tail shaft; a sleeve clutch member slidably splined on the tail shaft and overlying said clutch members, said sleeve clutch member being shiftable to drivingly connect either of the clutch members with the tail shaft; and a one-way drive means operable to drivingly connect the driven shaft directly with the tail shaft when the sleeve clutch member is disengaged from the clutch member on the driven shaft and the sun gear is released.

11. In a transmission for motor vehicles, a driven shaft; a tail shaft aligned with the driven shaft; planetary gearing having a carrier fixed to the driven shaft, a sun gear, a ring gear, and planet gears on the carrier meshing with the ring gear and the sun gear; speed governor operated means operable to brake or release the sun gear; a clutch member fixed to rotate with the ring gear; a clutch member fixed to the driven shaft between the clutch member fixed to the ring gear and the tail shaft; a sleeve clutch member slidably splined on the tail shaft and shiftable to connect either of the clutch members with the tail shaft; and a one-way drive means operable to automatically connect the clutch member fixed on the driven shaft directly with the tail shaft during forward drive and when the sleeve member is disengaged from the clutch member on the driven shaft and the sun gear is released.

12. In a motor vehicle transmission mechanism having planetary gearing including a sun gear, control mechanism for said sun gear comprising a shiftable member operable to hold or release said sun gear, means for shifting said member comprising an electric system including a solenoid and a pair of switches in parallel and operable independently to open and close a circuit to the solenoid, accelerator operable mechanism for controlling one of the switches, and speed responsive means for controlling the other of said switches.

13. A control system for a motor vehicle overdrive having a planetary gearing sun gear with a locking ring comprising a pawl for engaging the overdrive sun gear locking ring, a solenoid for moving the pawl, a current circuit for the solenoid, means responsive to a predetermined vehicle speed for controlling the circuit to the solenoid, and means in series with said speed controlled means and responsive to engine intake vacuum for controlling the circuit to the solenoid.

14. A control system for a motor vehicle overdrive having a planetary gearing sun gear with a locking ring comprising a pawl for engaging the overdrive sun gear locking ring, a solenoid for moving the pawl, a current circuit for the solenoid, speed responsive switch means in the circuit, switch means responsive to engine intake vacuum in the circuit in series with said speed responsive switch, and throttle responsive switch means in parallel with the speed responsive switch.

WALTER R. GRISWOLD.